(12) United States Patent
Niu

(10) Patent No.: US 8,168,839 B2
(45) Date of Patent: May 1, 2012

(54) CONTINUOUSLY CRACKING TECHNOLOGY OF WASTE RUBBER OR PLASTICS AND ITS EQUIPMENT

(76) Inventor: Bin Niu, Jinan (CN)

(*) Notice: Subject to any disclaimer, the term of this patent is extended or adjusted under 35 U.S.C. 154(b) by 758 days.

(21) Appl. No.: 12/296,181

(22) PCT Filed: Jun. 12, 2006

(86) PCT No.: PCT/CN2006/001282
§ 371 (c)(1),
(2), (4) Date: Oct. 6, 2008

(87) PCT Pub. No.: WO2007/115443
PCT Pub. Date: Oct. 18, 2007

(65) Prior Publication Data
US 2010/0121121 A1   May 13, 2010

(30) Foreign Application Priority Data
Apr. 7, 2006 (CN) .......................... 2006 2 0082731

(51) Int. Cl.
*C07C 1/00* (2006.01)
*C10B 57/04* (2006.01)
*C10B 7/00* (2006.01)

(52) U.S. Cl. ............. 585/241; 201/2.5; 201/25; 202/84; 202/89; 202/117; 202/118

(58) Field of Classification Search .................. 585/241; 201/2.5, 25; 202/84, 89, 117, 118
See application file for complete search history.

(56) References Cited

U.S. PATENT DOCUMENTS

| | | | | |
|---|---|---|---|---|
| 4,686,008 A * | 8/1987 | Gibson | ......................... | 202/118 |
| 5,738,745 A * | 4/1998 | Hudson et al. | ................ | 156/167 |
| 6,126,907 A * | 10/2000 | Wada | ......................... | 422/184.1 |
| 6,172,272 B1 * | 1/2001 | Shabtai et al. | ................ | 585/242 |
| 6,184,427 B1 * | 2/2001 | Klepfer et al. | ................ | 585/241 |
| 6,423,878 B2 * | 7/2002 | Reverso | ......................... | 585/241 |
| 7,341,646 B2 * | 3/2008 | Nichols et al. | ................ | 202/117 |

(Continued)

FOREIGN PATENT DOCUMENTS
CN   2219778   2/1996
(Continued)

OTHER PUBLICATIONS
Machine Translation of JP 09-268293.*
(Continued)

*Primary Examiner* — Nina Bhat
(74) *Attorney, Agent, or Firm* — Nixon & Vanderhye P.C.

(57) ABSTRACT

Certain examples relate to methods of continuously cracking waste rubber or plastics and apparatuses related to the same, to produce oil from waste rubber or plastics. Raw materials comprising a catalyst and rubber or plastics may be extruded in order to separate the air or to prevent oxidization. The raw materials are transported into the cracking chamber, and moved from the inlet to the discharge hole. After the cracking process is finished, the products are discharged automatically through the discharge hole. The separation of air and oxygen in the inlet and discharge hole of the cracking chamber can avoid dangers caused by oxygen entering the cracking chamber, and realize industrial production with continuous feedings. The ratio of the oil can be raised from 19% to 45%-48%, and the loss of production equipment reduced. Production costs are reduced, safety measurements improved, and continuous production is realized.

19 Claims, 1 Drawing Sheet

U.S. PATENT DOCUMENTS

| | | | |
|---|---|---|---|
| 7,375,255 B2 * | 5/2008 | Lee | 585/241 |
| 7,531,703 B2 * | 5/2009 | Ramesh et al. | 585/241 |
| 7,925,387 B2 * | 4/2011 | Zheng et al. | 700/291 |

FOREIGN PATENT DOCUMENTS

| | | |
|---|---|---|
| JP | 6256768 | 9/1994 |
| JP | 09-268293 * | 9/1997 |
| JP | 11090387 | 4/1999 |
| JP | 2001200272 | 7/2001 |
| JP | 2004323620 | 11/2004 |
| WO | 03/062351 | 7/2003 |
| WO | 03/104354 | 12/2003 |

OTHER PUBLICATIONS

International Search Report for PCT/CN2006/001282 mailed Nov. 16, 2006.

* cited by examiner

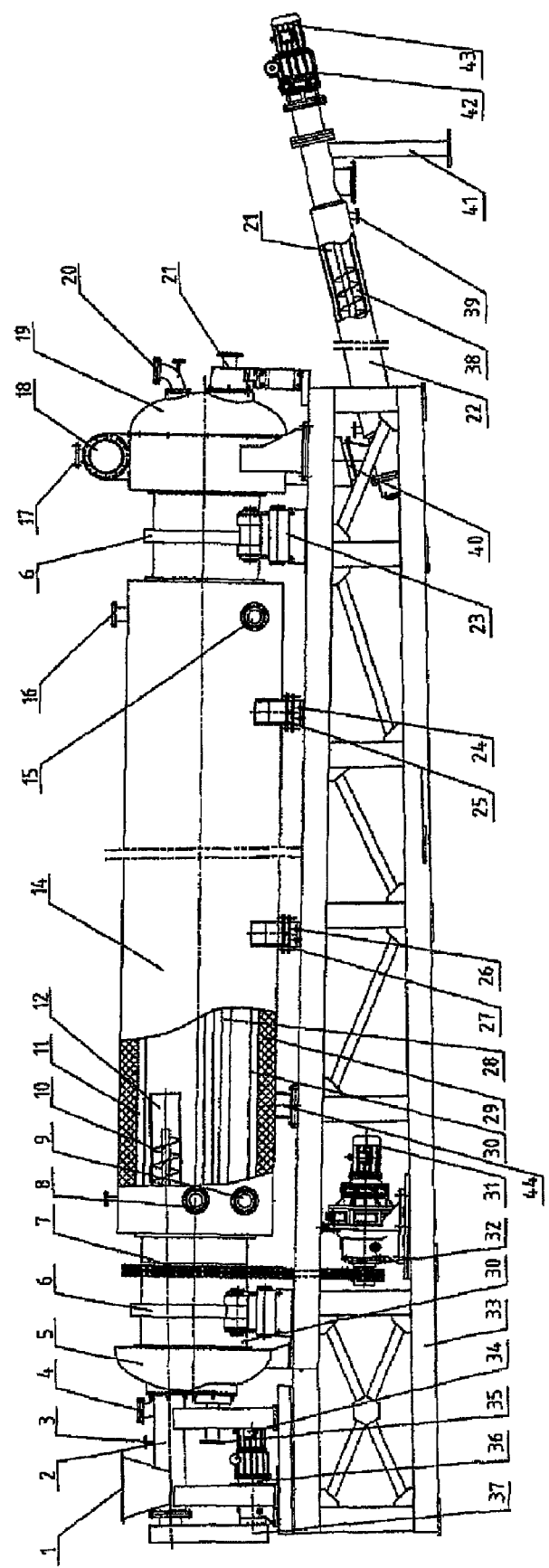

CONTINUOUSLY CRACKING TECHNOLOGY OF WASTE RUBBER OR PLASTICS AND ITS EQUIPMENT

This application is the U.S. national phase of International Application No. PCT/CN2006/001282 filed 12 Jun. 2006 which designated the U.S. and claims priority to Chinese Patent Application No. 200620082731.6 filed 7 Apr. 2006, the entire contents of each of which are hereby incorporated by reference.

FIELD OF INVENTION

This invention is about a new continuously cracking technology of waste rubber or plastics and its useful equipment, which is the key to produce oil by use of waste rubber or plastics.

BACKGROUND OF THE INVENTION

As is known, waste rubber or plastics can be re-produced into gasoline, diesel oil and others after being cracked, that not only gives out a good means for disposal of the industrial rubbish, like rubber, plastics, etc. from waste tyres and so on in modern society, but also provides a new plan for the improvement of decreasing resources and energy. However, almost none of present technologies can realize continuous production. Besides, the existing technology costs too much and has high risks for it fails to resolve the problem of remaining air in raw materials as well as the problem of air separation in the course of transport of raw materials and derivation of products. Therefore, the technology of producing oil by use of waste tyres and other rubber or plastics hasn't realized industrial continuous production.

SUMMARY OF THE INVENTION

To the shortage existing in present technologies, this invention provides a continuously cracking technology of waste rubber or plastics and its equipment, which has high security but low cost, can realize continuous and industrial production of oil by use of waste rubber or plastics.

The cracking course in this invention is to extrude and transport catalyst and rubber or plastics in the aim of separating air or preventing oxidization and transporting raw materials into the sealed cracking chamber, i.e. to expel air among and in raw materials out of the cracking chamber, meanwhile, to transport materials into it, which ensures material delivery and separation of cracking chamber and air outside both. In the cracking chamber, raw materials is transported from the inlet orifice to the discharge hole by the corresponding unit, cracking is finished in this process, and finally the products are automatically deviated through the discharge hole, which is also separated from the air outside. Via this process, the security in the cracking chamber can be ensured, and the continuous and industrial manufacture achieved.

In specific manufacture, the air-separating or oxidization-preventing feedings can be achieved by the structure of screw conveyor unit, which has variable pitch and can operate extrusion on rubber when propelling. As the extrusion goes on, the cleft between raw materials contracts and the air ejects gradually. To some extent, not only this part of air but that in raw materials will also be forced out, so as to realize no gas exists in raw materials on arriving at the cracking chamber, and because of the closely dense space, the separation between the cracking chamber and the air outside is also achieved, which ensures the hermetical effect of the cracking chamber and the safe operation of cracking. In order to make all air in the raw materials discharged completely, the rubber or plastics may as well be heated after or simultaneously with the air separation or oxidization prevention of material feedings. After heated, air in raw materials will fully eject; especially when heated in the meantime of extrusion, the inner air in raw materials will also be discharged compulsorily, and the best effect of extrusion and separation will be achieved. In fact, if raw materials are transported to the cracking chamber directly at the same time of cracking, because of the high temperature in the cracking chamber, in the course of transport of raw materials, as they approach, heat radiation and heat conduction will occur, raw materials will surely be heated simultaneously and the friction drag in the process of feedings will also be lessened, which smoothes the air separating and oxidization preventing feedings. To guarantee the extrusion effect, the late stages of the air separating and oxidization preventing feedings may as well be operated in the hermetical cracking chamber.

The gaseous products from cracking can adopt general methods. For example, we can realize sealing by the way of liquid passing. However, for solid products, the mode of spiral propeller can be used, i.e. a spiral propeller unit, which links with the discharge hole for solid products of the hermetical cracking chamber and whose front end stays higher than the back end. Under the help of weight, the solid products will be compacted at the discharge hole and sealing effect can be reached. On this basis, some space between the back-end of the screw blades of the working parts in the screw conveyor unit and the back-end of the discharge pipes may as well be made into cavity for a better sealing effect.

To make sure the movement of raw materials in the hermetical cracking chamber, the external force shall be imposed, such as pushing by the spiral propeller and so on. Surely, a revolving drum linking closely around can also be used, whose angle of inclination is greater than 0°, equal to 10° or less; the inlet orifice and discharge hole of the cracking chamber are equipped at upper and bottom position respectively. Thus, on one hand, under the help of weight, raw materials are inclined to move to the discharge hole; on the other hand, when the drum is revolving, raw materials can move forward in a screw way, and continuous cracking goes smoothly. Besides, this method can also be useful to realize the time length of reaction needed by smaller drums and reaches the effect of less space and less cost.

In addition, in order to make sure the balance of the temperature in the revolving drum and the cracking effect, the heating mode to the cracking chamber can adopt the way of inputting thermal medium reversely by two different pipes at the two terminals of the cracking chamber, i.e. thermal medium can be inputted from the two ends of the cracking chamber and through two pipes, and then goes out from their other ends respectively. That method can only use the internal heating pipes, i.e. installing the internal heating pipes through the cavity of the cracking chamber, dividing them into two parts and each inputting different ends of the cracking chamber and going out from the other ends; or only use the external heating mode, which realizes the balance of the temperature by the same heating method to the internal one. Apart from that, internal heating pipes and external heating cavity can be used simultaneously, which make the thermal medium inside move reversely and realize the balance of the temperature. Surely, an insulating unit shall be designed outside the external heating cavity to avoid loss of heat quantity as much as possible.

In the above cases, the cracking temperature of this technology can choose from 350 to 550□, and the average retention time of every part of raw materials in the cracking chamber is from 20 to 60 minutes. In this way, complete cracking of raw materials can be achieved.

According to the technological requirements, this invention has also designed the corresponding equipment for production. This equipment covers: a hermetical cracking chamber with the inlet orifice and discharge hole; an air-separating and oxidization-preventing feeding unit during extrusion and transport, which links with the inlet orifice; in the cracking chamber, a unit transporting raw materials from the inlet to the outlet and operating cracking; and a discharge unit, which is separated from the outside air, connecting with the discharge. As is stated before, the air-separating and oxidization-preventing feeding unit can adopt an extrusion unit with continuously or discontinuously variable pitch. If raw materials need heating during transport so as to reach the best separation effect, the back-end of the feeding pipes of the air-separating and oxidization-preventing feeding unit shall be inserted into the deep of the cracking chamber. After using of the above structure, if the back space of the screw unit becomes small enough, the effect of air separation and oxidization prevention can be guaranteed. However, this may affect the feeding speed, lengthen operating period of the whole equipment and raise its cost. In the light of this, some space will be kept especially in this invention between the back-end of the feeding pipes of the screw conveyor unit and the end of the screw, and thus a cavity will be formed and complete sealing will be obtained.

After the sealing problem of the inlet orifice on air separation or oxidization prevention being solved, its principle can be naturally applied into the problem of gas sealing of the discharge hole, i.e. the discharge unit will also be achieved by the spiral propulsive unit, which links with the discharge hole for solid products of the hermetical cracking chamber. Similarly, at the critical point of the best sealing, the spiral propulsive unit shall be designed to be low front-end and high back-end. Some space shall be kept between the back-end of screw blades and the back-end of the discharge pipe, and wherein a cavity will be formed.

The mechanism of transportation or movement of raw materials in the cracking chamber in this invention can be realized not only by present technology, but a sealing revolving drum with heating unit can also be adopted into it. The angle between the axis of the revolving drum and the level line shall be greater than 0° and equal to 10° or less; both ends of the revolving drum can be connected through the sealing unit with the two end covers fixed at the supporting frame; the inlet orifice and discharge hole of the cracking chamber are equipped at the upper and bottom end covers respectively.

As is described, the heating system in this invention can only include the internal heating pipes which are installed at the two end covers and go throughout the cavity of the cracking chamber, and also set an external heating unit with thermal insulation at the outside of the revolving drum. What's more, the external heating unit may as well be designed to have an outer cylinder which is equipped at the outside of the revolving drum and a thermal insulation around the outer cylinder. There is a thermal medium cavity between the revolving drum and the outer cylinder, whose liquid inlet and the liquid outlet of the internal heating pipes stay at the same end of the cracking chamber while whose liquid outlet and the liquid inlet of the internal heating pipes locate at the cracking chamber's other one. On this basis, the balance of the temperature in the cracking chamber will be guaranteed and the best cracking effect will be achieved.

All in all, through separation of air and oxygen at the inlet orifice and discharge hole of the cracking chamber, this invention can completely avoid the hidden dangers brought out by letting oxygen into the cracking chamber, thus realize the industrial production of continuous feedings. The equipment of this invention can achieve cooperation between internal and external heating, so that the cracking chamber can be heated evenly and highly, and the quality of the discharge oil can be improved. The ratio of the oil can be raised from 19% in current technology to 45%-48%, and the loss of production equipment can be reduced. Therefore, production cost will become lower, safety measurement will become better and highly effective and continuous production will really come true.

BRIEF DESCRIPTION OF THE DRAWINGS

FIG. 1 is the structural representation of the concrete operation of this invention.
In this FIGURE:
1. Feed magazine, 2. Feeding pipe, 3. Catalyst imports, 4. Safety valve, 5. End cover, 6. Turning table, 7. Sprocket, 8. Inlet, 9. Inlet, 10. Screw, 11. Thermal medium cavity, 12. Cavum, 13. Cavity, 14. Outer cylinder, 15. Outlet, 16. Outlet, 17. Inspection hole, 18. Gas discharge hole, 19. End cover, 20. Safety valve, 21. Inlet, 22. Discharge pipe, 23. Load-bearing rolling wheel, 24. Chain wheel, 25. Support saddle, 26. Chain wheel, 27. Support saddle, 28. Internal heating pipe, 29. Thermal insulation, 30. Revolving drum, 31. Electrical motor, 32. Retarding unit, 33. Motor frame, 34. Electrical motor, 35. Outlet, 36. Reducer, 37. Chain Transmission Gearing, 38. Working part of screw with rotary blade, 39. Screw connection, 40. Solid discharge hole, 41. Supporting frame, 42. Reducer, 43. Electrical motor, 44. Support saddle

DETAILED DESCRIPTION OF THE PREFERRED EMBODIMENT

Example 1

The technological process of this example is as following: transport the blocks or tablets of the rubber or plastics added with catalyst into the hermetical cracking chamber during extrusion for removing the gas among the raw materials; put pressure on the internal of the raw materials to discharge the possibly existing gas; then send the raw materials into the hermetical cracking chamber. The catalyst used in this example is well known in the fields of the cracking of rubber or plastics. In the cracking chamber, raw materials are flowing from the inlet orifice to the discharge hole under the influence of the external force or self-weight, and the cracking reaction occurs at the same time. The cracking temperature may be reached by the present technology. When the materials reaches the end of the cracking chamber, the gas formed before will be exhausted through a water-sealed unit and the solid products will be lead through the discharge hole into the equipment in the next process.

The equipment in this example may adopt direct extrusion unit, peripheral exhaust unit, and finally hermetical pipes to realize extrusion and air trap. The cracking chamber can use a vertical structure, which can ensure the movement and cracking of raw materials under the direct help of gravity or the indirect influence of external forces, such as turning. After reaction, when raw materials arrive at the end of the cracking chamber, the solid products can be led out by gravity. On the other hand, the piled solid products can also seal the discharge hole Although this method can complete the production automatically, its feedings are generally discontinuous. Besides, some problems in practical application may exist, such as poor technological reliability, simple and crude equipments, large volume, and so on.

Example 2

The technological process of this example is as following: transport the blocks or tablets of rubber or plastics added with catalyst into the hermetical cracking chamber at the same time of extrusion with variable pitch, The rest parts exercise the same technology as that in example 1 and here are skipped.

The equipment in this technology is similar to Example 1 except the air trapping feeding unit is altered into the feeding unit by the screw conveyor unit, which has variable pitch and can operate extrusion on rubber when propelling. By this way, raw materials can be compacted when reaching the cracking chamber, separate the air outside and guarantee the sealing at the inlet orifice of the cracking chamber.

Compared with Example 1, this example can achieve continuous feedings and provide great help to the completion of the technological process. However, problems of Example 1 in other parts still exist.

Example 3

The technological process of this example is based on Example 1 or 2: Heat raw materials at the same time of air separating or oxidization preventing feedings of the rubber or plastics added with catalyst. In this way, gas inside can be extruded smoothly and the best sealing effect in the cracking chamber can be guaranteed. But the realization of this effect may adopt the mode of the installment of a heating unit in or outside of the transport unit. The corresponding equipment is improved on the basis of Example 1 and 2, for example, adding a heating unit in the feeding screw shaft or around the peripheral part of the charging line. Other parts are the same as Example 1 or 2.

Example 4

The technological process of this example is as following: connect the technological process of air separating or oxidization preventing feedings stated in Example 1 and 2 with the inlet orifice of the cracking chamber. In the process of feeding, as approaching, raw materials will be heated by the heat radiation of the high temperature in the cracking chamber or the heat conduction of the charging line, which is useful to the discharge of the gas in raw materials and can strengthen the trapping effect of the cracking chamber. The rest parts in this example exercise the same technology as that in example 1 or 2 and here are skipped.

The equipment in this technology is the same as that in Example 1 or 2 except the direct connection between the outlet of the extrusion feeding parts and the inlet orifice of the cracking chamber.

Example 5

The technological process of this example is as following: transport raw materials into the cracking chamber following the technology in Example 1 or 2 or 3 or 4. In order to exclude adequately the gas in the raw materials and form a cylindrical hermetical construction naturally, the process of transport needs to push a distance forward in the cracking chamber. The other parts may adopt directly the same technology as stated in the above examples.

The specific way of realization is, based on the technology in Example 1 or 2 or 3 or 4, to insert the feeding pipes some distance into the cracking chamber. This program will surely be more simple and convenient based on the structure of Example 4.

Example 6

The inputting and cracking process of raw materials in this example may choose any mode from the above examples. However, because the solid products will be discharged out through the solid discharge hole, the sealing between the discharge hole and the external world will be required strictly, i.e. the process of deviation of solid products shall be sealed, which may be realized by the spiral propeller unit whose outlet end stays higher than its inlet end. What's more, the weight of the solid products and the influence of the internal pressure make the discharge hole compacted and thus the function of separation and air trap is realized.

The oblique spiral propeller unit is installed at and connected with the discharge hole of the cracking chamber. This unit includes a discharge pipe, which is linked with the solid discharge hole of the cracking chamber and a screw. The position where the screw runs through the discharge pipe is higher than the inlet of the discharge pipe, and the screw connects with the driving unit.

Example 7

The technological process of this example is on the basis of Example 6 to keep a cavity without spiral propelling at the end of the discharge pipe.

Based on Example 6, the equipment in this technology is the spiral propelling unit, whose end of the discharge pipe is longer than the working part of the screw. Only the polish rod passes through the longer part of the discharge pipe and connects the screw and the driving part, which reinforces the sealing of air separation or oxidization prevention by the piled solid products.

Example 8

The technological process of this example is the improvement of the above methods by adopting a new-style cracking chamber different from the above ones. This kind of cracking chamber includes an inclined revolving drum. The space between the drum and its fixing structure around is sealed by the present technology, such as steel ring, asbestos and so on. The angle of inclination of the revolving drum can range from 0° and 10° (including 10°), such as 0.01°, 0.05°, 0.1°, 0.3°, 0.5°, 0.8°, 1.0°, 1.5°, 2.5°, 3°, 3.5°, 4°, 4.5°, 5°, 5.5°, 6°, 6.5°, 7°, 7.5°, 8°, 8.5°, 9°, 9.5°, 10° and so on.

The equipment in the above technology needs to equip both ends of the revolving drum on two fixed end covers. Their connecting point will be sealed by current technology, like steel ring, asbestos, etc. to realize sealing at the dynamic condition and form a hermetical cracking chamber. In order to realize the movement of raw materials from the inlet orifice to the discharge hole, the inlet orifice and the discharge hole of the cracking chamber are equipped at upper and bottom end covers respectively. The driving of the revolving drum adopts the present technology, like the supporting roller below, and can also use a sprocket fixed around the drum to realize turning by the chains linking with the driving unit.

Example 9

The technological process of this example can exercise any form in the examples mentioned before, except a new-style heating mode. The specific contents are as follows: transport two heat sources into the pipeline and import thermal medium from two ends of the cracking chamber reversely. The specific realizing mode in this example is to install heating pipes fixed at the two ends of the cavity of the cracking chamber. One part of the heating pipes transports heat from the discharge hole to the inlet orifice, and the other part reversely.

The equipment in this example can get further realization under the help of the above examples. The specific structure is to install heating pipes fixed at the two ends of the cavity of the cracking chamber. These pipes are divided into two parts, from different entrances on two ends importing thermal medium reversely.

Example 10

The technological process of this example can exercise any form in the examples mentioned before, except a new-style heating mode in the process of cracking. The specific contents are as follows: transport two heat sources into the pipeline and import thermal medium from two ends of the cracking chamber reversely. The specific realizing mode in this example is to install external heating pipes or heating cavities fixed at the two ends of bulkhead of the cavity of the cracking chamber. One part of the heating pipes or one heating cavity transport heat from the discharge hole to the inlet orifice, and the other part or cavity reversely.

The equipment in this example can get further realization under the help of the above examples. The specific structure is to install external heating pipes or two external heating cavities fixed at the two ends of the bulkhead of the cavity of the cracking chamber. These pipes are divided into two parts, from different entrances on two ends importing thermal medium reversely.

Example 11

The technological process of this example can exercise any form in the Example 1 to 8, except a new-style heating mode in the process of cracking. The specific contents are as follows: transport two heat sources into the pipeline and import thermal medium from two ends of the cracking chamber reversely. The specific realizing mode in this example is to install heating pipes fixed at the two ends of the cavity of the cracking chamber, to equip external heating cavity outside the cracking chamber and to make thermal medium transmitted reversely in the internal and external units.

Based on any kind of equipment in Example 1 to 8, the specific equipment in this example is internal heating pipes in the cracking chamber and external heating cavity on the bulkhead of the cracking chamber. During production, the thermal medium inside flows reversely and thus the balance of the temperature in the cracking chamber can be achieved.

Example 12

The technological process in this example is as following:
This example adopts the way of screw extrusion conveyance firstly to realize the air-separating feedings. Raw materials are transported directly some distance into the cracking chamber, and the end of the working part of the screw extrusion conveyance is shorter than the end of the feeding pipe, and thus a cavum without screw appears. The cracking process is carried on within a revolving drum, the temperature inside is 350□, and the average retention time of every part of raw materials in the cracking chamber is ranging from 20 to 60 minutes. The inside cavity of the revolving drum uses the internal heating mode and the outside has external heating unit, both transporting thermal medium oppositely for the balance of the temperature in the revolving drum. The gas formed from cracking at the end of the revolving drum is discharged at the hydraulic sealing outlet, and the solid discharge hole is connected with the declining spiral propeller, which adopts the uniform pitch unit or the increasing pitch unit. Besides, the inlet linking directly with the discharge pipe of the spiral propeller and the solid discharge hole of the cracking chamber stays lower than its outlet. At the end of the working part of the screw, which is longer than the end of the discharge pipe, some space is kept and thus a cavity is formed for automatic discharge.

The structure of the equipment in this example is as following:

It includes a motor frame 33; an outer cylinder 14 fixed on the motor frame 33 and the angle between whose axis and the level line shall be greater than 0° and less than or equal to 10° (such as 0.01°, 0.05°, 0.1°, 0.3°, 0.5°, 0.8°, 1.0°, 1.5°, 2.5, 3°, 3.5°, 4°, 4.5°, 5°, 5.5°, 6°, 6.5°, 7°, 7.5°, 8°, 8.5°, 9°, 9.5°, 10° and so on); a revolving drum 30 with the same axis to the outer cylinder 14 in it; the two ends of the revolving drum 30 are set on the two end covers 5 and 19 of the motor frame 33, and the linking parts are sealed strictly in present way; by the retarding unit 32, the electrical motor 31 drives the sprocket 7 which is fixed at the outside of the revolving drum 30 to realize the turning of the revolving drum 30; on the motor frame 33, a load-bearing rolling wheel 23 is equipped cooperating with the turning table 6 fixed at the revolving drum 30.

In the revolving drum 30 of this invention, the two ends of the internal heating pipe 28 is fixed on the end covers 5 and 19 for the flowing of the thermal medium. There is a thermal insulation 29 in the outer cylinder 14, and the thermal medium cavity 11 between the outer cylinder 14 and the revolving drum 30, the inlet 8, 9 and outlet 15, 16 on the two ends of the outer cylinder 14. The flow direction of the thermal medium in the thermal medium cavity 11 is opposed to that in the internal heating pipe 28.

The feeding inlet of the revolving drum 30 is set on the above end cover, and connected with air-separating feeding unit. This unit includes the feeding pipe 2 and the screw 10 which is equipped in the feeding pipe 2 and connected with the electrical motor 34 and has continuously or discontinuously smaller pitch. The feeding pipe 2 inserts into the revolving drum 30, and the linking point will use the sealing connection. Between the end of the feeding pipe and the end of the working part of the screw blades of the screw 10, some space will be kept and thus a cavum 12 will appear.

The gas discharge hole 18 and solid discharge hole 40 are set on the lower part of the revolving drum 30 and link with the outside of the revolving drum 30 by regular sealing way (like hydraulic sealing). The solid discharge hole 40 is connected to the inclined discharge pipe 22, whose end stays higher than the solid discharge hole 40. In the discharge pipe 22, there is a screw connecting with the electrical motor 43. Between the end of the working part of screw with rotary blade 38 and the end of the discharge pipe 22, some space exists, wherein a cavity 13 is formed.

The thermal expansion unit can be installed on the revolving drum 30 and the outer cylinder 14. The thermal expansion unit set on the outer cylinder 14 includes at least two of the support saddles 25, 27 and 44, which are connected steadily with the outer cylinder 14. On the inlet end, the support saddle 44 is set on the motor frame 33. On the lower part of the support saddles 25 and 27 set the chain wheel 24 and 26, and on the motor frame 33 chain wheel guides are equipped; the thermal expansion unit installed on the revolving drum 30 includes a stretching unit fixed on the two ends of the revolving drum. The stretching unit can guarantee sealing during stretching and can be realized by the present technology.

All the above can be realized by the present technology and hasn't carried on technological properties description and here are skipped.

Example 13

Apart from the cracking temperature and cracking time, the technological process of this example is the same as that in Example 12. So is its equipment.

The cracking temperature in this example is 355° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 14

Apart from the cracking temperature and cracking time, the technological process of this example is the same as that in Example 12. So is its equipment.

The cracking temperature in this example is 360°C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 15

Apart from the cracking temperature and cracking time, the technological process of this example is the same as that in Example 12. So is its equipment.

The cracking temperature in this example is 365° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 16

Apart from the cracking temperature and cracking time, the technological process of his example is the same as that in Example 12. So is its equipment.

The cracking temperature in this example is 370° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 17

Apart from the cracking temperature and cracking time, the technological process of this example is the same as that in Example 12. So is its equipment.

The cracking temperature in this example is 375° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 18

Apart from the cracking temperature and cracking time, the technological process of this example is the same as that in Example 12. So is its equipment.

The cracking temperature in this example is 380° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 19

Apart from the cracking temperature and cracking time, the technological process of this example is the same as that in Example 12. So is its equipment.

The cracking temperature in this example is 385° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 20

Apart from the cracking temperature and cracking time, the technological process of this example is the same as that in Example 12. So is its equipment.

The cracking temperature in this example is 390° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 21

Apart from the cracking temperature and cracking time, the technological process of this example is the same as that in Example 12. So is its equipment.

The cracking temperature in this example is 395° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 22

Apart from the cracking temperature and cracking time, the technological process of this example is the same as that in Example 12. So is its equipment.

The cracking temperature in this example is 400° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 23

Apart from the cracking temperature and cracking time, the technological process of this example is the same as that in Example 12. So is its equipment.

The cracking temperature in this example is 405° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 24

Apart from the cracking temperature and cracking time, the technological process of this example is the same as that in Example 12. So is its equipment.

The cracking temperature in this example is 410° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 25

Apart from the cracking temperature and cracking time, the technological process of this example is the same as that in Example 12. So is its equipment.

The cracking temperature in this example is 415° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 26

Apart from the cracking temperature and cracking time, the technological process of this example is the same as that in Example 12. So is its equipment.

The cracking temperature in this example is 420° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 27

Apart from the cracking temperature and cracking time, the technological process of this example is the same as that in Example 12. So is its equipment.

The cracking temperature in this example is 425° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 28

Apart from the cracking temperature and cracking time, the technological process of this example is the same as that in Example 12. So is its equipment.

The cracking temperature in this example is 430° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 29

Apart from the cracking temperature and cracking time, the technological process of this example is the same as that in Example 12. So is its equipment.

The cracking temperature in this example is 435° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 30

Apart from the cracking temperature and cracking time, the technological process of this example is the same as that in Example 12. So is its equipment.

The cracking temperature in this example is 440° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 31

Apart from the cracking temperature and cracking time, the technological process of this example is the same as that in Example 12. So is its equipment.

The cracking temperature in this example is 445° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 32

Apart from the cracking temperature and cracking time, the technological process of this example is the same as that in Example 12. So is its equipment.

The cracking temperature in this example is 450° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 33

Apart from the cracking temperature and cracking time, the technological process of this example is the same as that in Example 12. So is its equipment.

The cracking temperature in this example is 455° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 34

Apart from the cracking temperature and cracking time, the technological process of this example is the same as that in Example 12. So is its equipment.

The cracking temperature in this example is 460° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 35

Apart from the cracking temperature and cracking time, the technological process of this example is the same as that in Example 12. So is its equipment.

The cracking temperature in this example is 465° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 36

Apart from the cracking temperature and cracking time, the technological process of this example is the same as that in Example 12. So is its equipment.

The cracking temperature in this example is 470° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 37

Apart from the cracking temperature and cracking time, the technological process of this example is the same as that in Example 12. So is its equipment.

The cracking temperature in this example is 475° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 38

Apart from the cracking temperature and cracking time, the technological process of this example is the same as that in Example 12. So is its equipment.

The cracking temperature in this example is 480° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 39

Apart from the cracking temperature and cracking time, the technological process of this example is the same as that in Example 12. So is its equipment.

The cracking temperature in this example is 485° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 40

Apart from the cracking temperature and cracking time, the technological process of this example is the same as that in Example 12. So is its equipment.

The cracking temperature in this example is 490° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 41

Apart from the cracking temperature and cracking time, the technological process of this example is the same as that in Example 12. So is its equipment.

The cracking temperature in this example is 495° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 42

Apart from the cracking temperature and cracking time, the technological process of this example is the same as that in Example 12. So is its equipment.

The cracking temperature in this example is 500° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 43

Apart from the cracking temperature and cracking time, the technological process of this example is the same as that in Example 12. So is its equipment.

The cracking temperature in this example is 505° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 44

Apart from the cracking temperature and cracking time, the technological process of this example is the same as that in Example 12. So is its equipment.

The cracking temperature in this example is 510° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 45

Apart from the cracking temperature and cracking time, the technological process of this example is the same as that n Example 12. So is its equipment.

The cracking temperature in this example is 515° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 46

Apart from the cracking temperature and cracking time, the technological process of this example is the same as that in Example 12. So is its equipment.

The cracking temperature in this example is 520° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 47

Apart from the cracking temperature and cracking time, the technological process of this example is the same as that in Example 12. So is its equipment.

The cracking temperature in this example is 525° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 48

Apart from the cracking temperature and cracking time, the technological process of this example is the same as that in Example 12. So is its equipment.

The cracking temperature in this example is 530° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 49

Apart from the cracking temperature and cracking time, the technological process of this example is the same as that in Example 12. So is its equipment.

The cracking temperature in this example is 535° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 50

Apart from the cracking temperature and cracking time, the technological process of this example is the same as that in Example 12. So is its equipment.

The cracking temperature in this example is 540° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 51

Apart from the cracking temperature and cracking time, the technological process of this example is the same as that in Example 12. So is its equipment.

The cracking temperature in this example is 545° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

Example 52

Apart from the cracking temperature and cracking time, the technological process of this example is the same as that in Example 12. So is its equipment.

The cracking temperature in this example is 550° C. The average retention time of every part of raw materials in the cracking chamber is 20 or 23 or 25 or 28 or 30 or 32 or 35 or 37 or 40 or 43 or 45 or 47 or 50 or 53 or 55 or 58 or 60 minutes.

I claim:

1. A method of continuously cracking waste rubber and/or plastics, comprising:

at least partially extruding raw materials comprising waste rubber and/or plastics, with a catalyst, via an air-separating and/or oxidization-preventing material feeding unit comprising an extrusion unit and a feeding pipe connected to a cracking chamber, the extrusion unit further comprising a screw conveyor unit having a variable pitch and causing extrusion while propelling, wherein the screw conveyor unit includes a screw located in the feeding pipe, and the screw does not extend as deeply into a cracking chamber as does an end of the feeding pipe, such that there is a cavity formed by space between the end of the feeding pipe and an end of the screw;

transporting the at least partially extruded raw materials into the cracking chamber via the material feeding unit, wherein the screw conveyor unit and the cavity operate to reduce an amount of air and/or oxygen reaching an interior of the cracking chamber;

causing said raw materials to be moved from an inlet orifice of the cracking chamber to a discharge hole, during which cracking is performed; and discharging the products through the discharge hole.

2. The method of claim 1, wherein the raw materials are heated after or simultaneously with the air separation and/or oxidization prevention.

3. The method of claim 2, wherein the heating of raw materials is achieved by heat radiation and/or heat conduction from the temperature within the cracking chamber when the raw materials are transported into said cracking chamber.

4. The method of claim 1, wherein the cracking chamber is hermetically sealed, and late stages of extrusion to separate air and/or prevent oxidization are carried out in the hermetically sealed cracking chamber.

5. The method of claim 4, wherein the discharge hole of the hermetically sealed cracking chamber is connected to a discharge pipe having an inlet end and an exit end, wherein the discharge pipe comprises a spiral propulsive unit, and wherein the exit end of the discharge pipe is at a higher elevation than the inlet end.

6. The method of claim 4, wherein the hermetically sealed cracking chamber comprises a hermetical revolving drum, wherein an angle of inclination of the hermetical revolving drum is greater than 0° but less than or equal to 10° with respect to a horizontal axis, such that the inlet orifice located at a first end of the revolving drum is set at a higher elevation than the solid discharge hole located at a second end of the revolving drum.

7. The method of claim 1, wherein the cracking chamber is heated by use of first and second of pipelines, located on opposite sides of the cracking chamber, wherein the first pipeline transfers heat from the discharge hole to the inlet orifice, and the second pipeline transfers heat from the inlet orifice to the discharge hole.

8. The method of claim 7, wherein at least one of the first or second pipelines comprises internal heating pipes that are installed and run proximate an inner portion of the cracking chamber.

9. The method of claim 1, wherein an exterior of the cracking chamber is covered by a thermal insulation unit and/or an external heating unit.

10. The method of claim 1, wherein a cracking temperature ranges from 350° C. to 550° C., and an average retention time of the raw materials in the cracking chamber is from 20 to 60 minutes.

11. An apparatus for continuously cracking waste rubber and/or plastics, the apparatus comprising:

a hermetically sealed cracking chamber with an inlet orifice and a discharge hole;

an air-separating and/or oxidization-preventing material feeding unit connected to the inlet orifice of the cracking chamber to transport raw materials comprising rubber and/or plastics into the cracking chamber, the material feeding unit comprising a feeding pipe, wherein an end of the feeding pipe is positioned in the cracking chamber, the material feeding unit also comprising an extrusion unit comprising a screw conveyor unit having a variable pitch to at least partially extrude the raw materials, wherein the screw conveyor unit includes a screw located in the feeding pipe, and the screw does not extend as deeply into the cracking chamber as does the feeding pipe such that there is a cavity formed by space between the end of the feeding pipe and an end of the screw; and a transporting unit in the cracking chamber to transport the at least partially extruded raw materials from the inlet orifice to the discharge hole while cracking occurs, wherein the discharge hole is isolated from the outside air.

12. The apparatus of claim 11, wherein the discharge hole of the hermetically sealed cracking chamber is connected to a discharge pipe having an exit end and an inlet end, wherein the discharge pipe comprises a spiral propulsive unit, and wherein the exit end of the discharge pipe is at a higher elevation than the inlet end.

13. The method of claim 12, wherein the spiral propulsive unit comprises a working part with screw blades, and wherein there is a cavity formed by space between an end of the working part with screw blades in the spiral propulsive unit and a back-end of the discharge pipe.

14. The apparatus of claim 11, wherein the hermetically sealed cracking chamber comprises a revolving drum with a sealed heating unit, wherein an angle between the revolving drum and a horizontal axis is greater than 0° but less than or equal to 10° ; wherein first and second ends of the revolving drum are linked through the sealed heating unit to first and second end covers fixed at the supporting frame; and the inlet orifice of the hermetically sealed cracking chamber is located at an upper portion of the first end cover and the discharge hole of the hermetically sealed cracking chamber is located at a lower portion of the second end cover.

15. The apparatus of claim 14, wherein the sealed heating unit in the hermetically sealed cracking chamber includes internal heating pipes each comprising first and second ends, wherein the first and second ends of the heating pipes are installed at the first and second end covers respectively and run through a cavity of the cracking chamber.

16. The apparatus of claim 14, wherein an exterior of the revolving drum is equipped with an external heating unit with thermal insulation.

17. The apparatus of claim 16, wherein said external heating unit comprises an outer cylinder with thermal insulation covering the revolving drum; and between the revolving drum and the outer cylinder, a thermal medium cavity is formed; a liquid inlet of the cavity and a liquid outlet of internal heating pipes are located at a first end of the cracking chamber; and a liquid outlet of the cavity and a liquid inlet of the internal heating pipes are located at a second end of the cracking chamber.

18. The method of claim 1, wherein the catalyst is added to the raw materials via a catalyst import before the raw materials are transported into the cracking chamber.

19. An apparatus for continuously cracking waste rubber and/or plastics, the apparatus comprising:
- a hermetically sealed cracking chamber with an inlet orifice and a discharge hole;
- a material feeding unit connected to the inlet orifice of the cracking chamber to transport raw materials comprising rubber and/or plastics into the cracking chamber, the material feeding unit comprising at least a feeding pipe and a screw;
- wherein the screw is located at least partially in the feeding pipe, and has a variable pitch; and
- wherein an end of the feeding pipe is positioned at a first distance into the cracking chamber, and an end of the screw is positioned at a second distance into the cracking chamber, the first distance is greater than the second distance such that there is a cavity formed by space between the end of the feeding pipe and the end of the screw, and the variable pitch and the cavity operate to reduce an amount of air and/or oxygen reaching an interior of the cracking chamber; and
- a transporting unit in the cracking chamber to transport the at least partially extruded raw materials from the inlet orifice to the discharge hole while cracking occurs, wherein the discharge hole is isolated from the outside air.

* * * * *